Figure 1:
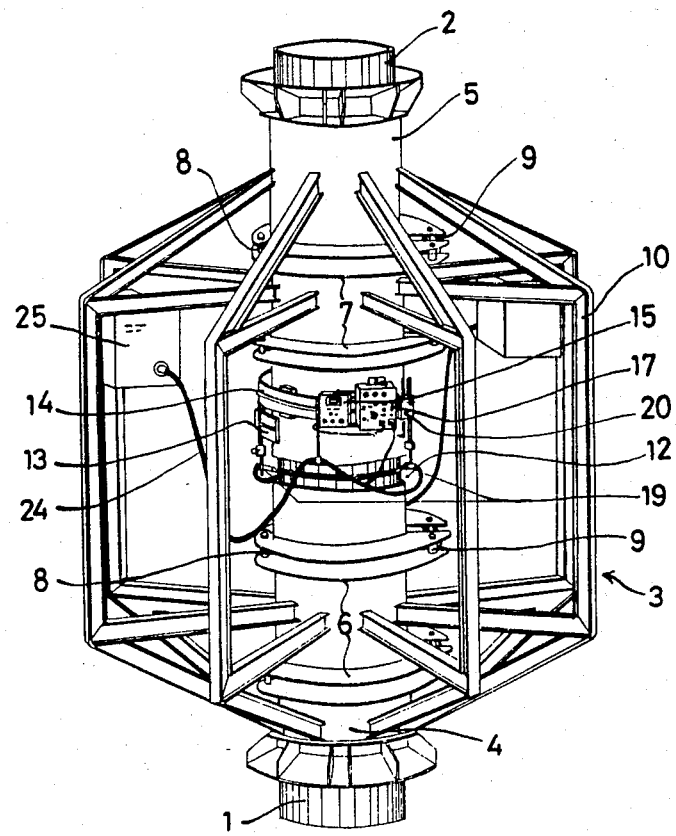

United States Patent [19]

van den Berg

[11] Patent Number: 4,542,276

[45] Date of Patent: Sep. 17, 1985

[54] DEVICE FOR WELDING TUBES

[75] Inventor: Arie P. van den Berg, Mildam, Netherlands

[73] Assignee: Mantra Tube Ltd., St. Peter Port, England

[21] Appl. No.: 572,674

[22] Filed: Jan. 19, 1984

[30] Foreign Application Priority Data

Jan. 20, 1983 [NL] Netherlands ................ 8300207

[51] Int. Cl.$^4$ ................ B23K 37/02; B23K 9/225
[52] U.S. Cl. ................ 219/60 A; 219/61.4
[58] Field of Search ............ 219/60 A, 60 R, 61, 219/61.4

[56] References Cited

U.S. PATENT DOCUMENTS

| 3,727,025 | 4/1973 | Dibenedetto | 219/60 A |
| 3,800,116 | 3/1974 | Tanaka et al. | 219/60 A |
| 4,373,125 | 2/1983 | Kazlauskas | 219/60 A |

Primary Examiner—Roy N. Envall, Jr.
Assistant Examiner—Catherine M. Sigda
Attorney, Agent, or Firm—Beehler, Pavitt, Siegemund, Jagger & Martella

[57] ABSTRACT

A device for welding together coaxial tube sections, comprising a cage adapted to surround the extremities of said tube sections, and provided with sleeves to be clamped on said tube sections for aligning the latter, guiding means for welding electrode carriers being connected to said sleeves which are adapted to guide welding electrodes and associated equipment along the welding seam to be formed between said tube sections.

16 Claims, 2 Drawing Figures

DEVICE FOR WELDING TUBES

For performing welding operations on tubes to be interconnected at their extremities, more or less automatically operating welding devices are known, in which one or more welding electrodes are guided in respect of the tubes to be welded together in such a manner that said electrodes are guided along the welding seam to be formed. Of course the tubes must be mutually aligned and must be supported with the end faces at a small mutual distance.

When using tubes which, in the vertical position, are used as supporting legs for drilling islands and similar purposes, there exists a need for welding devices allowing the tubes to be welded together in the vertical utilization position. It is, then, very difficult to maintain such very heavy and long tubes well aligned and at the correct distance.

The invention provides a device for this purpose, allowing to maintain such tube sections accurately aligned, and to make welding connections between successive tube sections without substantial work interruptions.

To that end the device according to the invention is characterised by a cage consisting of channel beams or the like, said cage having revolution symmetry around a longitudinal axis, and having a substantially polygonal cross-section, the inner transverse dimensions being substantially larger than the diameter of the tubes to be welded, by tube guiding sleeves provided at or near both extremities of said cage, by clamping means, provided at these sleeves, by means of which both sleeves can be clamped coaxially on the respective tube sections to be welded together, which sleeves are maintained mutually aligned by said cage, and by substantially circular guides connected to said cage and situated in a plane substantially perpendicular to said longitudinal axis, said guides being arranged substantially coaxially in respect of said longitudinal axis, along which guides carriages or slides of welding electrode fittings are movable coaxially in respect of the longitudinal axis, which carriages or slides are provided with means for adjusting the electrodes in question in respect of the welding seam.

Such a cage has, in the axial direction, such a stiffness that the extremities of the tubes to be welded together can be effectively mutually aligned thereby, said tubes, and in particular the upper tube, being, of course, suspended in such a manner that moments acting on the cage as a consequence of the own weight of said tubes can be kept as small as possible, and, furthermore, the guides for the welding electrodes are fixedly arranged in respect of the cage so that guiding can take place coaxially in respect of the cage axis independently of the clamped tube sections, said cage and electrodes forming a coherent unit, and, as soon as said cage is clamped on the respective tube extremities, also the welding electrodes are situated substantially in the correct position, and only a small additional adjustment in the vertical direction will be required.

Since, now, welding can take place substantially automatically, the cage can, in particular, be completely closed so that the surrounding of the welding seam is protected against the effects of ambient influences such as rain, wind, sea water or the like.

The terminal sleeves extend, in particular, towards the vicinity of the welding site, and are situated at a distance which is sufficiently large for the welding operation so that the alignment will be maintained also in the direct vicinity of the welding site.

The guides for the welding electrode carriers can be attached to the terminal sleeves, and are, then, situated as near as possible to the welding site, it being preferred to attach these guides exclusively to the upper sleeve, since, then, said guides will be kept free from sparks, welding waste and the like produced during welding.

On said guides at least two electrode carriers are provided which are situated at equal angular distances, and which each are adapted to be moved to and fro along a guide by a corresponding angle so that the supply ducts need not be led around the tubes.

Furthermore each carriages or slide can be provided with a plurality of welding electrode fittings allowing to make plural welds, and these additional carriages of slides can be provided with means for examining the welding seam formed, e.g. by means of ultrasonic vibrations.

Never the guides for these carriages or slides current conductors can be arranged which are to be contacted by current collectors on said carriages or slides, in which case a complete revolution of the welding electrodes is possible, provided that gas containers for supplying a protection gas, if used, move along with said carriages or slides.

Figure 2:
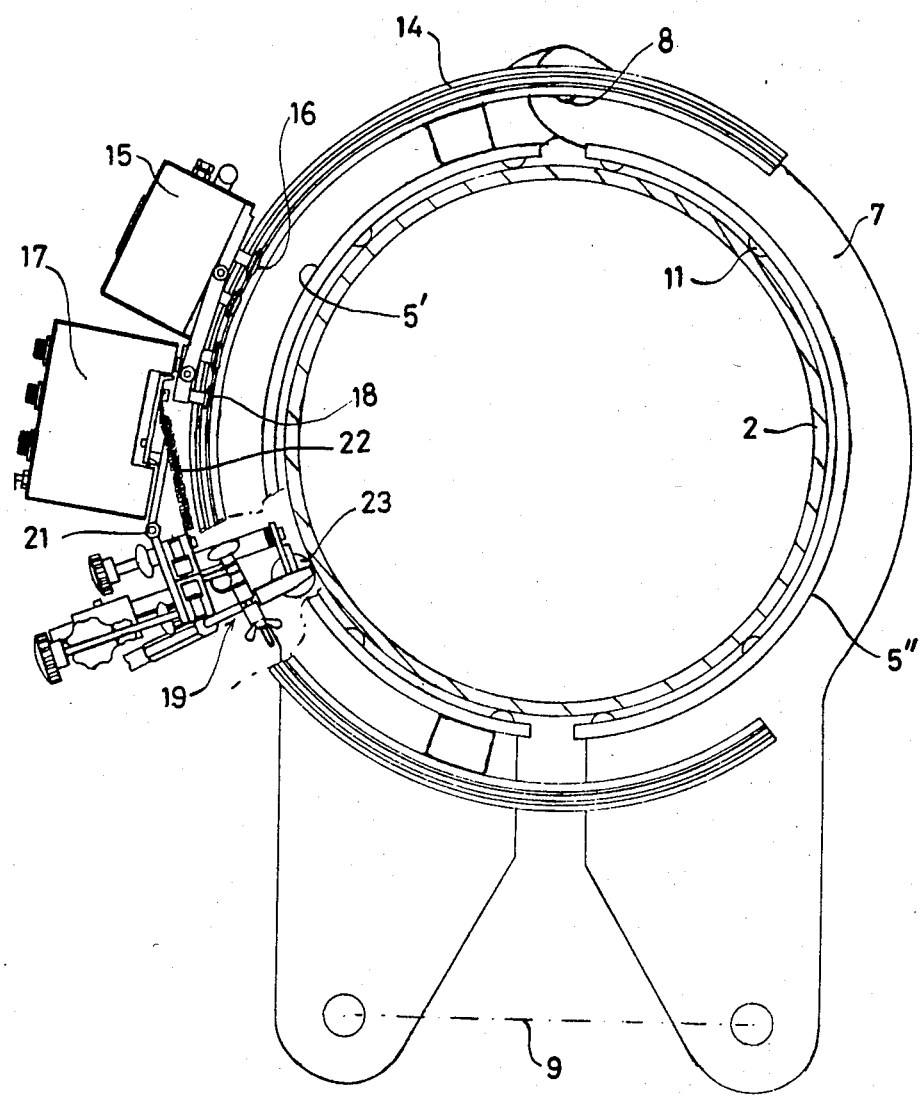

The invention will be elucidated below in more detail by reference to a drawing, showing in:

FIG. 1 a representation in perspective of a preferred embodiment of the device according to the invention; and FIG. 2 a simplified cross-section of such a device without the cage.

In FIG. 1 the extreme parts of two tubes 1 and 2 to be interconnected are shown, which tubes are supported in the vertical position. The lower tube 1, for instance, has been welded during a preceding welding operation to a preceding lower tube, and the upper tube 2 has been removed by means of a lifting tool from a storage, and has being lowered on the former one. These tubes are, now, mutually aligned by means of a cage 3 according to the invention.

The cage 3 comprises a lower and an upper terminal sleeve 4 and 5 resp., which sleeves each are provided with clamping elements 6 and 7 resp., and are, for instance, split along a longitudinal median plane, the sleeve halves being kept together by means of the clamping elements 6 and 7. Said clamping elements comprise, in particular, a hinge 8 and a tensioning means 9, the latter preferably being in the form of a cylinder to be actuated by a pressure medium, in particular oil.

Both sleeves 4 and 5 are rigidly interconnected by means of a plurality of stiff frame-works constructed from channel beams, said frame-works being so stiff that both sleeves 4 and 5 are always maintained coaxial. These frame works are not further interconnected, so that swinging open the divided sleeves 4 and 5 on the hinges 8 is not impeded.

These sleeves have an inner diameter which is adapted to the outer diameter of the tubes 1 and 2. Preferably these sleeves are provided, at their inner sides, with rounded ridges or cams 11 which are directed substantially parallel to the axis and are uniformly distributed on the circumference, and which, as appears from FIG. 2, contact the surface of the tube to be clamped as the respective clamping element 6 or 7 is tensioned. If tubes of different diameter are to be used, the sleeves 4 and 5 can be provided with adapted detachable linings having ridges 11 adapted to the tube diameter in question.

The sleeves 4 and 5 remain at some distance from one another, so that an opening 12 is left free therebetween where the welding seam between the tubes 1 and 2 can be formed. On each half 5' and 5" of the upper sleeve 5 guides 13 and 14 resp. are mounted, which guides are each directed coaxially to the sleeve half in question, and have each an arc length of more than 180° as shown in FIG. 2 for the guide 14. The other guide 13 is mounted at a different height on the other half 5" of the sleeve 5, the extremities of these guides somewhat overlapping each other as appears from FIG. 1.

On each guide 13 and 14 an electrode assembly is slidably mounted, each assembly consisting of a casing 15 with a reversible driving motor adapted to drive one or more travelling wheels 16 running on the respective guide, a second casing 17 with means for controlling the driving motor and for regulating the welding current, said casing being guided by means of travelling wheels 18 on the respective guide, and a welding electrode 19 which is connected to the casing 17 by means of a vertical adjusting element 20 and a hinge 21 (FIG. 2), and is pressed by means of a drawspring 22, a schematically indicated roller 23 being adapted to bear on one of the tubes so as to keep the welding electrode at the desired distance from the tube surface. This electrode comprises, in particular, means not shown for supplying a welding wire dependent on the measured arc voltage, and means for maintaining a protection gas environment around the arc. Conduits 24 connected to a fixed connecting casing 25 on the cage 3 provide the supply of electric currents and protecting gas.

The driving control is such that both electrodes can perform along the respective guides an alternating movement having an angular extension of about 180°, this in such a manner that the welding seams formed by both electrodes somewhat overlap at their extremities, so that, eventually, a completely closed seam is obtained.

The number of times that the electrode moves to and fro depends, of course, on the desired thickness of the welding seam and on the thickness of each welding seam part formed during each passage.

Since the electrodes always move to and fro over a portion of the outer circumference the conduits 24 will not be wound around the tubes. The guides 13 and 14 are fixed on the respective sleeve halves 5' and 5" in such a manner that when opening the sleeve the guide of the other sleeve half remains free. Since, furthermore, the guides are fixedly mounted on the cage 3, the electrodes remain always connected with the cage which considerably simplifies arranging and removing tubes in and from the cage 3 respectively, and also arranging and adjusting the electrodes 19 in respect of the welding seam to be formed.

The guides 13 and 14 are preferably fixed both to the upper sleeve, since, then, it can be avoided that particles and sparks falling downwards during welding will land on these guides.

As soon as the tubes 1 and 2 are clamped in the respective sleeves 4 and 5, the end faces then being situated in the interspace 12, the electrodes 19 are adjusted if required, and then the arc is fired and the automatic drive and control is switched on. After completing the welding connection the sleeves 4 and 5 are released, the tubes welded together are pushed downwards, and a new tube is introduced at the upper end into the sleeve 5. As soon as the various tubes have reached the desired position, the sleeves 4 and 5 are tensioned again, and the next welding operation can begin.

It will be clear that, instead of the hinges 8 of the clamping elements 6 and 7, also tensioning means 9 can be provided at both sides, and, if desired, the cage can also be made completely divisible. It is also possible to use a larger number of welding electrodes, and the stroke length thereof will be smaller accordingly.

In devices according to the invention which are designed for welding very thick tubes, a floor can be laid in the cage on the lower transverse beams of the various frame-works, so that an operator can stand within the cage, which simplifies the adjustment of the welding electrodes and monitoring the welding operation. Since, furthermore, the welding operation proceeds mainly automatically, the cage can be provided with closed walls adapted to shield the welding area from ambient influences.

The separate casings 15 and 17 can, of course, be combined to a single one, and also plural welding electrode carriers can be provided allowing if desired, to form plural welding seams. Furthermore means moving along with the electrodes can be provided for examining the welding seam, e.g. by means of ultrasound.

Furthermore it is possible to arrange current conductors near the guides 13 and 14 which are contacted by current collectors mounted on one of the casings 15 or 17, so that, then, the connecting cables 24 can be left out, and the electrode can perform complete revolutions, provided that the guides 13 and 14 are mutually aligned and allow an unimpeded transfer of the respective casings. If a protection gas is used, gas containers moving onward with the electrodes can be used, so that, then, no hoses or conduits impeding the movement will be present anymore.

I claim:

1. A device for welding two tubes end-to-end comprising:
   a pair of coaxial sleeves, a rigid framework defining a cage for supporting said sleeves in axially spaced apart relationship, each sleeve being adapted to surround one tube and being provided with clamping means adapted to hold the tube in axial alignment with a second tube held in the other sleeve while maintaining a gap between the ends of the two tubes, with the gap lying between said sleeves;
   guide means within said cage for guiding at least one welding electrode assembly along a circular path coaxial with said sleeves and contained in a plane lying between and perpendicular to said sleeves for depositing a weld seam within the gap between the tubes clamped in said sleeves;
   the inner transverse dimensions of said cage in the plane of said circular path being substantially greater than the inner diameter of said sleeves.

2. The device of claim 1 wherein said guide means are mounted on one or both of said sleeves.

3. The device of claim 1 wherein each said sleeve comprises at least two parts mounted for opening and closing movement transversely to the longitudinal axis of said sleeves, said clamp means being connected for moving said parts into and out of clamping engagement with a tube positioned within said sleeve.

4. The device of claim 1 wherein said cage forms an enclosure substantially closed against the elements such as rain, wind, etc.

5. The device of claim 1 wherein the longitudinal axis of the device is oriented vertically and said sleeves include an upper sleeve and a lower sleeve, and wherein said guide means are fixed only onto the upper sleeve.

6. The device of claim 1 wherein said welding electrode means comprise at least two electrode fittings mounted onto said guides at mutually equal angular spacing.

7. The device of claim 1 further comprising inspection means for examining a formed welding seam, said inspection means being mounted for displacement along said guide means.

8. The device of claim 1 further comprising current conductors disposed near said guide means, said welding electrode means being provided with current collectors in contact with said current conductors.

9. The device of claim 1 further comprising protection gas containers mounted for joint movement with said welding electrode means along said guide means.

10. The device of claim 1 wherein said framework comprises a plurality of frame members which are rigid in the axial direction but which are not interconnected in the circumferential direction in order to allow deformation of the sleeves during tensioning thereof.

11. The device of claim 1 wherein each of said sleeves is provided with cam elements or ridges on their said clamp means, said cams or ridges being dimensioned and configured to make contact with a tube section to be clamped within said sleeve at uniform angular distances about the tube section.

12. The device of claim 1 wherein each of said sleeves consists of parts which are hingedly connected and wherein said clamp means include means for hingedly moving said sleeve parts between an open released position and a closed clamping position.

13. The device of claim 12 wherein the clamping means are actuatable by means of a pressurized medium.

14. A device for welding end to end tubes comprising:
   a pair of sleeves, a plurality of frame members defining a cage supporting said sleeves in co-axial, axially spaced spaced apart relationship, each sleeve adapted to surround one tube and being provided with clamping means adapted to hold the tube in axial alignment with a tube held in the other sleeve;
   guide means mounted to one of said sleeves within said cage for guiding one or more welding electrode assemblies along a circular path co-axial with said sleeves, said path contained in a plane lying between and perpendicular to said sleeves for depositing a weld seam between the tubes clamped in said sleeves;
   each said sleeve comprising at least two parts mounted for opening and closing movement transversely to the longitudinal axis of said sleeves, said clamp means being connected for moving said parts into and out of clamping engagement with a tube positioned within said sleeve;
   said framework comprising a plurality of frame members rigid in the axial direction, but not interconnected in the circumferential direction in order to allow for deformation of said sleeves during clamping thereof.

15. The device of claim 14 wherein said sleeve parts are hingedly connected and wherein said clamp means include means for hingedly moving said sleeve parts between an open released position and a closed clamping position.

16. The device of claim 15 wherein the frame members constituting said cage are mounted to said sleeve parts and are hingedly movable therewith so as to allow lateral placement of tubes into the open sleeves for subsequent clamping therein after hinging closure of said sleeves and said cage.

* * * * *